G. E. TRAUB.
PNEUMATIC TIRE PRESSURE GAGE AND DUST CAP.
APPLICATION FILED SEPT. 19, 1912.
1,091,780.
Patented Mar. 31, 1914.
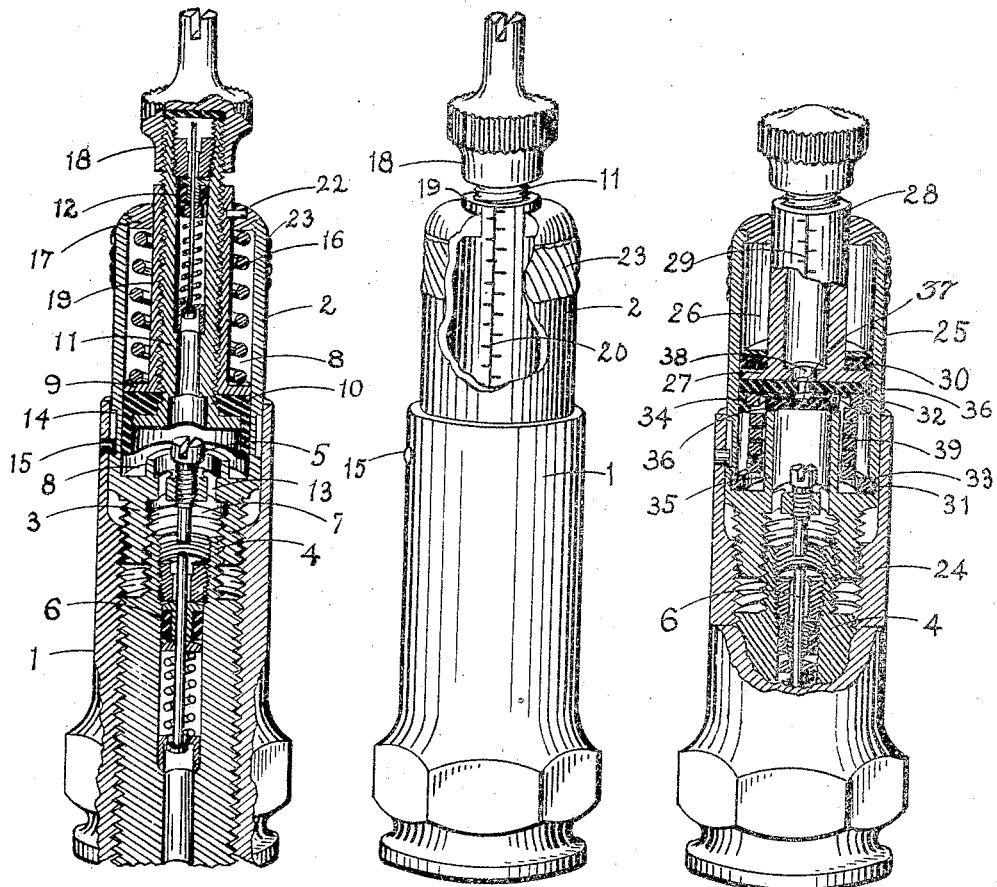
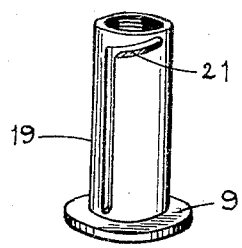
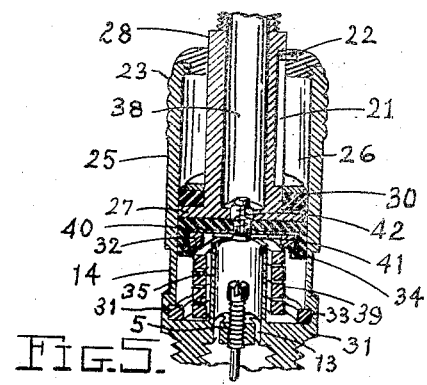
Witnesses:
F. M. Keeney
Mrs D. J. Nyama
Inventor:
George E. Traub.
By James W. Hyatt
Atty.

UNITED STATES PATENT OFFICE.

GEORGE E. TRAUB, OF SAN DIEGO, CALIFORNIA.

PNEUMATIC-TIRE PRESSURE-GAGE AND DUST-CAP.

1,091,780.

Specification of Letters Patent. Patented Mar. 31, 1914.

Application filed September 19, 1912. Serial No. 721,249.

*To all whom it may concern:*

Be it known that I, GEORGE E. TRAUB, a citizen of the United States, residing at San Diego, in the county of San Diego and State of California, have invented an Improved Pneumatic-Tire Pressure-Gage and Dust-Cap, of which the following is a specification.

This invention has reference to a new and useful device comprising an organization of elements which are capable of controlling the inflating medium of pneumatic tires and of determining the pressure of the inflating medium therein and of registering such pressure; the device being also capable of protecting the air valve of a pneumatic tire from dust.

It is a design of the invention to so relate the elements, that they may, without removing the device from the tire valve, be elected for the admission of the inflating medium, or for indicating the pressure of the contained medium, and for closing said tire valve to effectually retain the inflating medium in the tire.

It is a further design of the invention to construct a casing for the elements which shall be adapted for application to the valve of a pneumatic tire in a manner similar to a dust cap, and which shall contain suitable compartments for performing the functions set forth.

The principles herein related may be embodied in any suitable form of mechanism, and therefore, for the purpose of explanation, such invention may be embodied to comprehend, essentially, a threaded sleeve of a tire valve, a cylinder casing relatively adjustable with said sleeve, having an air chamber and a spring operated piston within said chamber, a graduated stem extending from the air chamber, a valve within said stem, and an adjustable releasing screw in the cylinder casing for opening the tire valve, the parts being relatively adjustable for controlling and indicating the pressure of an inflating medium for a pneumatic tire.

An embodiment of the invention is shown in the accompanying drawings, whereon—

Figure 1 is a sectional and perspective view of a device incorporating the principles of this invention; Fig. 2 is a perspective view of the same with a part of the cylinder chamber cut away to show the pressure indicating marks on the piston stem; Fig. 3 illustrates a modified form of the invention; Fig. 4 is a detail view of the piston stem as shown in Figs. 1 and 2, disclosing the groove thereon for locking the piston in a closed position; and Fig. 5 is a detail view of the spring and plunger shown in Fig. 3.

In the several views similar reference characters apply to like parts.

Assuming the invention to be embodied in the form illustrated, the elements referred to may be mounted in an external casing comprising a threaded sleeve 1 and a cylinder chamber 2, relatively adjustable therewith. It may be readily seen from the drawing that the casing is approximately co-extensive in dimension with an ordinary dust cap as used on an automobile tire, and when applied to a tire valve, may be left attached thereto permanently, it being only necessary to remove the same when the tire is removed from the wheel rim.

Cylinder 2 is provided with an extension 3, exteriorly threaded to engage with sleeve 1, and interiorly threaded to engage with the tire valve stem 4. An adjustable screw 5 is provided for opening valve 6 of the pneumatic tire. The tire valve is opened by turning the cylinder casing until screw 5 engages with valve 6.

Cylinder 2 is divided into chambers 7 and 8, of which chamber 7 communicates directly with valve 6, of the tire, and chamber 8 has a piston 9, mounted therein. A rubber part 10, makes contact with the walls of the chamber and is secured to the piston by a valve stem 11, having therein a valve 12, whereby an inflating medium may be admitted to the device. Openings or ports 13 give immediate communication between chambers 7 and 8. The wall of chamber 8 is provided with an annular groove 14, and sleeve 1 is provided with a pin 15 engaging with said groove, the same limiting the longitudinal movement of cylinder 2, and, when the cylinder is in the position as shown in Fig. 1, and is turned tightly against said pin, is locked in position and prevented from becoming detached from sleeve 1. A coiled spring 16 is interposed between piston 9 and upper end 17 of the cylinder, and normally tends to force the piston downward or against the pressure of the inflating medium which may be admitted to chambers 7 and 8, through valve 6.

When an inflating medium shall be admitted to the tire, cylinder 2 is screwed down or until the valve actuating screw 5 operates valve 6, of the tire. Cap 18 may then be removed and pressure admitted through valve 12 to inflate the tire. The pressure of the inflating medium in the lower end of chamber 8 will force the spring actuated piston 9 upward or against the tension of spring 16. Piston stem 19 is provided with graduations 20 whereby the pressure of the inflating medium may be determined. When the desired pressure is attained, cylinder 2 may be operated longitudinally until valve 6 is released, whereupon the tire will remain inflated. Piston stem 19 is provided with a groove 21, circumferentially arranged, and adapted to engage with a pin 22, in the upper end of the cylinder, the groove having a pitch whereby the stem may be turned to lock the piston within chamber 8, and also effectually close openings or ports 13.

It will be seen from the foregoing that the invention comprehends an organization of elements relatively operable for the control of an inflating medium for pneumatic tires, and for registering the pressure thereof, and provided with a housing or casing which is effectual as a dust cap for the protection of the air valve of a pneumatic tire. An inflating medium may be admitted to the tire without releasing the piston and stem, as in the closed position of the piston, a passage is formed with the tire, intercepted only by the tire valve and the valve in the piston stem.

It is a feature of the invention that the parts are few, compactly arranged, and efficient for performing the functions herein set forth.

With this device applied to the pneumatic tires of a vehicle, as for instance, an automobile, the tires may be inflated to a uniform pressure if desired, and the pressure in any one of the tires may be instantly determined, this being accomplished by first releasing piston stem 19, and then turning the cylinder until the tire valve is opened. Knurls 23 are provided for convenience in operating cylinder 2.

I have for convenience described the pressure valve and gage as in a vertical position, but it will be evident that it may be operated at any angle, my invention comprising the elements as described, the form and arrangement of which may be modified, provided the essential characteristics are retained.

A modified form of my invention is shown in Fig. 3, in which sleeve 24 is adapted to screw upon valve stem 4, of a pneumatic tire. A cylinder part 25, is adapted to engage with valve stem 4, and operate valve 6, in the same manner as the device shown in Figs. 1 and 2. In chamber 26, a piston 27 is mounted and is adapted to reciprocate therein. Piston stem 28 is provided with graduations 29 for registering the pressure of the inflating medium in the tire. A friction washer 30, is secured to piston 27, and engages with the walls of the cylinder chamber, thereby holding the piston in any position to which it may be forced by the pressure of the inflating medium. A coiled spring of rectangular cross-section having its end coils 31 and 32 of larger diameter, is secured in the bottom of chamber 26, a groove 33 being provided in the wall of the chamber engaging with coil 31 of the spring. The upper coil 32, engages with a washer 34, and forces the same tightly against the walls of the chamber, forming a plunger for the spring. The spring coils are normally in a closed position, forcing the plunger down upon extension 35 in the bottom of the chamber. A washer 36 directly beneath washer 34, carries a valve 37, provided for opening 38, and is designed to be closed by the pressure which may be admitted to the chamber from the pneumatic tire, thereby causing the plunger 34 to actuate piston 27, and determine the pressure.

In use the inflating medium is admitted through piston stem 28, to the chamber, the pressure of which will cause spring 39 to be distended, thereby opening valve 37 for the admission of the inflating medium to the tire. The piston 27 remains in position upon release of the pressure.

Should the invention be embodied in the form as shown in Fig. 5, the parts may comprise a cylinder 25, arranged to be attached to a pneumatic tire nipple as in Figs. 1 and 2, and having mounted in chamber 26, a piston 27 which reciprocates therein. A closed coil spring 39, rectangular in section, is secured in the bottom of chamber 26, a groove 33 being provided in the wall of the chamber, engaging with coil 31 of the spring. The upper coil 32 of the spring, engages with a thin steel washer 40, which is provided with a disk valve 41, normally held closed by spring 42. Washer 34 is forced by spring 39, against the walls of the chamber, forming a plunger for the spring.

In use the inflating medium may be admitted through piston stem 28 and valve 41 to the chamber, the pressure causing plunger 34 to move longitudinally and force piston 27 upward. Piston 27 remains in position upon release of the pressure thereby automatically registering the same. The tire pressure may be ascertained by adjusting the cylinder so that releasing screw 5 may operate the tire valve, which will admit the inflating medium to the lower part of chamber 26, thereby causing the device to register the pressure as aforesaid. It will be noted that washer 40 so incases the upper spring coil, as to operate in unison therewith, thereby securing positive action of plunger 34. The cylinder and piston are locked in the same manner as the device shown in Figs. 1, 2, 3, and 4.

I claim as my invention:

1. In a pneumatic tire pressure gage, the combination with a threaded sleeve adapted to be secured to the tire valve nipple, of a cylinder having screw connection with said threaded sleeve, a valve releasing screw in the bottom of said cylinder for releasing the tire valve when said cylinder is screwed inwardly, a piston in said cylinder, a piston stem extending from said cylinder having a groove therein longitudinally and circumferentially arranged and having a pitch relative to the piston stem, a pin in the upper end of said cylinder adapted to engage with said groove whereby said piston may be locked within said cylinder; a spring interposed between said piston and the upper end of said cylinder casing and acting against the pressure of the inflating medium, graduations upon said piston stem to indicate the pressure of the inflating medium, a valve in said piston stem adapted to admit the inflating medium to the cylinder chamber, and means for locking the cylinder out of engagement with the tire valve, comprising a pin engaging with the edges of an annular groove on the cylinder, substantially as set forth.

2. In a pneumatic tire pressure gage, the combination with a threaded sleeve adapted to be secured to the nipple of a tire valve, of a cylinder casing of approximately the same diameter as said nipple and having screw connection with said sleeve, means for limiting the longitudinal movement of the cylinder and locking it in the outward position, a spring actuated piston within said cylinder, a piston stem extending from the cylinder having graduations thereon, means carried by the cylinder for releasing the tire valve, means for locking the piston in a closed position to form a continuous passage from the tire valve to the upper end of the piston stem, and a valve in said piston stem, substantially as set forth.

In testimony whereof I have hereunto affixed my signature to the foregoing specification, this 12th day of September, in the year 1912.

GEORGE E. TRAUB.

In the presence of—
F. M. KEENEY,
S. R. HYAMS.